(12) United States Patent
Smith et al.

(10) Patent No.: US 10,730,525 B2
(45) Date of Patent: Aug. 4, 2020

(54) SYSTEM AND METHOD FOR MONITORING FATIGUE DURING OPERATION OF EQUIPMENT

(71) Applicant: Caterpillar Inc., Deerfield, IL (US)

(72) Inventors: Nigel G. Smith, Peoria, IL (US); Todd A. Dawson, Middleboro, MA (US); Matthew D. Fletcher, Washington, IL (US); Snigdha N. Pande, Peoria, IL (US); Xinyu L. Wen, Peoria, IL (US); Silvano V. Angelone, Stow, MA (US); Samuel R. Soto, Peoria, IL (US); Elisa B. Begner, Elmwood, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/299,541

(22) Filed: Mar. 12, 2019

(65) Prior Publication Data

US 2020/0070838 A1    Mar. 5, 2020

Related U.S. Application Data

(60) Provisional application No. 62/726,017, filed on Aug. 31, 2018.

(51) Int. Cl.
| | |
|---|---|
| *B60W 40/08* | (2012.01) |
| *G08B 21/06* | (2006.01) |
| *B60K 28/06* | (2006.01) |
| *G05D 1/00* | (2006.01) |
| *B60Q 9/00* | (2006.01) |
| *G06F 17/11* | (2006.01) |

(52) U.S. Cl.
CPC ............ *B60W 40/08* (2013.01); *B60K 28/06* (2013.01); *B60Q 9/00* (2013.01); *G05D 1/0088* (2013.01); *G06F 17/11* (2013.01); *G08B 21/06* (2013.01); *B60W 2040/0827* (2013.01); *B60W 2300/12* (2013.01)

(58) Field of Classification Search
None
See application file for complete search history.

(56) References Cited

U.S. PATENT DOCUMENTS

| | | | |
|---|---|---|---|
| 8,075,484 B2 | 12/2011 | Moore-ede | |
| 8,652,041 B2 | 2/2014 | Moore-ede | |
| 8,957,779 B2 | 2/2015 | Wu et al. | |
| 9,198,575 B1 | 12/2015 | Blacutt et al. | |
| 2010/0311023 A1* | 12/2010 | Kan | G09B 19/0038 |
| | | | 434/258 |

(Continued)

FOREIGN PATENT DOCUMENTS

WO    2015000087    1/2015

*Primary Examiner* — Thomas S McCormack
(74) *Attorney, Agent, or Firm* — Schwegman, Lundberg & Woessner

(57) ABSTRACT

A system and method for monitoring fatigue during operation of equipment is provided. A system includes a processor subsystem; and a memory comprising instructions, which when executed by the processor subsystem, cause the processor subsystem to: determine a number of fatigue events of that an operator experienced while operating equipment over a time period; determine a weighted alertness score based on the number of fatigue events, the weighted alertness score determined using a non-linear function; and initiate a remedial response based on the weighted alertness score.

21 Claims, 7 Drawing Sheets

(56) References Cited

U.S. PATENT DOCUMENTS

| | | | |
|---|---|---|---|
| 2014/0210625 A1* | 7/2014 | Nemat-Nasser | G08B 21/06 |
| | | | 340/575 |
| 2015/0015400 A1 | 1/2015 | Davis et al. | |
| 2016/0362118 A1* | 12/2016 | Mollicone | B60W 40/09 |
| 2017/0355377 A1* | 12/2017 | Vijaya Kumar | B60W 40/08 |

* cited by examiner

FIG. 7

SYSTEM AND METHOD FOR MONITORING FATIGUE DURING OPERATION OF EQUIPMENT

RELATED APPLICATIONS

This application claims the benefit of priority to U.S. Provisional Application Ser. No. 62/726,017, filed Aug. 31, 2018, which is incorporated herein by reference in its entirety.

TECHNICAL FIELD

The present disclosure relates generally to environmental monitoring systems and, more particularly, to a system and method for monitoring fatigue during operation of equipment.

BACKGROUND

Driver or equipment operator fatigue is a precursor to a number of potential safety incidents. Fatigue, which may include drowsiness, weariness, tiredness, exhaustion, distraction, or other conditions of reduced alertness, may impact an operator's response time, causing them to react slower than an alert operator. In a passenger vehicle this may result in a collision or other accident. In a construction or other industrial setting, accidents due to fatigue may result in lower productivity, equipment damage, or even loss of life. By capturing environmental and physiological data that indicates operator fatigue, a supervisor or other response mechanism may be used to ensure continued safe operation.

SUMMARY

Example 1 is a system for monitoring alertness, the system comprising: a processor subsystem; and a memory comprising instructions, which when executed by the processor subsystem, cause the processor subsystem to: determine a number of fatigue events of that an operator experienced while operating equipment over a time period; determine a weighted alertness score based on the number of fatigue events, the weighted alertness score determined using a non-linear function; and initiate a remedial response based on the weighted alertness score.

In Example 2, the subject matter of Example 1 includes, wherein the time period is a work shift.

In Example 3, the subject matter of Examples 1-2 includes, wherein the non-linear function is an inverse sigmoid function.

In Example 4, the subject matter of Examples 1-3 includes, wherein the non-linear function is a polynomial function.

In Example 5, the subject matter of Examples 1-4 includes, wherein to initiate the remedial response, the processor subsystem is to interface with an advanced driver assistance system.

In Example 6, the subject matter of Examples 1-5 includes, wherein to initiate the remedial response, the processor subsystem is to interface with an autonomous vehicle control system.

In Example 7, the subject matter of Examples 1-6 includes, wherein the remedial response comprises reducing a functionality of the equipment.

In Example 8, the subject matter of Examples 1-7 includes, wherein the remedial response comprises disabling a functionality of the equipment.

In Example 9, the subject matter of Examples 1-8 includes, wherein the remedial response comprises generating an alert notification.

In Example 10, the subject matter of Example 9 includes, wherein the alert notification is presented to the operator.

In Example 11, the subject matter of Examples 9-10 includes, wherein the alert notification is presented to a supervisor of the operator.

In Example 12, the subject matter of Examples 9-11 includes, wherein the alert notification comprises one of: an audible alert, a visual alert, or a haptic alert.

In Example 13, the subject matter of Examples 1-12 includes, instructions to cause the processor subsystem to display the weighted alertness score in a presentation.

In Example 14, the subject matter of Examples 1-13 includes, instructions to cause the processor subsystem to aggregate weighted alertness scores of several time periods to calculate an aggregate alertness score.

In Example 15, the subject matter of Example 14 includes, instructions to cause the processor subsystem to average aggregate alertness scores of a plurality of operators over the several time periods.

In Example 16, the subject matter of Example 15 includes, wherein the plurality of operators comprise a work crew.

In Example 17, the subject matter of Examples 14-16 includes, instructions to cause the processor subsystem to display the aggregate alertness score in a presentation.

Example 18 is a method of monitoring alertness, the method comprising: determining a number of fatigue events of that an operator experienced while operating equipment over a time period; determining a weighted alertness score based on the number of fatigue events, the weighted alertness score determined using a non-linear function, and initiating a remedial response based on the weighted alertness score.

In Example 19, the subject matter of Example 18 includes, wherein the time period is a work shift.

In Example 20, the subject matter of Examples 18-19 includes, wherein the non-linear function is an inverse sigmoid function.

In Example 21, the subject matter of Examples 18-20 includes, wherein the non-linear function is a polynomial function.

In Example 22, the subject matter of Examples 18-21 includes, wherein initiating the remedial response comprises interfacing with an advanced driver assistance system.

In Example 23, the subject matter of Examples 18-22 includes, wherein initiating the remedial response comprises interfacing with an autonomous vehicle control system.

In Example 24, the subject matter of Examples 18-23 includes, wherein the remedial response comprises reducing a functionality of the equipment.

In Example 25, the subject matter of Examples 18-24 includes, wherein the remedial response comprises disabling a functionality of the equipment.

In Example 26, the subject matter of Examples 18-25 includes, wherein the remedial response comprises generating an alert notification.

In Example 27, the subject matter of Example 26 includes, wherein the alert notification is presented to the operator.

In Example 28, the subject matter of Examples 26-27 includes, wherein the alert notification is presented to a supervisor of the operator.

In Example 29, the subject matter of Examples 26-28 includes, wherein the alert notification comprises one of: an audible alert, a visual alert, or a haptic alert.

In Example 30, the subject matter of Examples 18-29 includes, displaying the weighted alertness score in a presentation.

In Example 31, the subject matter of Examples 18-30 includes, aggregating weighted alertness scores of several time periods to calculate an aggregate alertness score.

In Example 32, the subject matter of Example 31 includes, averaging aggregate alertness scores of a plurality of operators over the several time periods.

In Example 33, the subject matter of Example 32 includes, wherein the plurality of operators comprise a work crew.

In Example 34, the subject matter of Examples 31-33 includes, displaying the aggregate alertness score in a presentation.

Example 35 is a non-transitory machine-readable medium including instructions, which when executed by a machine, cause the machine to perform operations comprising: determine a number of fatigue events of that an operator experienced while operating equipment over a time period; determine a weighted alertness score based on the number of fatigue events, the weighted alertness score determined using a non-linear function; and initiate a remedial response based on the weighted alertness score.

In Example 36, the subject matter of Example 35 includes, wherein the time period is a work shift.

In Example 37, the subject matter of Examples 35-36 includes, wherein the non-linear function is an inverse sigmoid function.

In Example 38, the subject matter of Examples 35-37 includes, wherein the non-linear function is a polynomial function.

In Example 39, the subject matter of Examples 35-38 includes, wherein to initiate the remedial response, the processor subsystem is to interface with an advanced driver assistance system.

In Example 40, the subject matter of Examples 35-39 includes, wherein to initiate the remedial response, the processor subsystem is to interface with an autonomous vehicle control system.

In Example 41, the subject matter of Examples 35-40 includes, wherein the remedial response comprises reducing a functionality of the equipment.

In Example 42, the subject matter of Examples 35-41 includes, wherein the remedial response comprises disabling a functionality of the equipment.

In Example 43, the subject matter of Examples 35-42 includes, wherein the remedial response comprises generating an alert notification.

In Example 44, the subject matter of Example 43 includes, wherein the alert notification is presented to the operator.

In Example 45, the subject matter of Examples 43-44 includes, wherein the alert notification is presented to a supervisor of the operator.

In Example 46, the subject matter of Examples 43-45 includes, wherein the alert notification comprises one of: an audible alert, a visual alert, or a haptic alert.

In Example 47, the subject matter of Examples 35-46 includes, instructions to cause the processor subsystem to display the weighted alertness score in a presentation.

In Example 48, the subject matter of Examples 35-47 includes, instructions to cause the processor subsystem to aggregate weighted alertness scores of several time periods to calculate an aggregate alertness score.

In Example 49, the subject matter of Example 48 includes, instructions to cause the processor subsystem to average aggregate alertness scores of a plurality of operators over the several time periods.

In Example 50, the subject matter of Example 49 includes, wherein the plurality of operators comprise a work crew.

In Example 51, the subject matter of Examples 48-50 includes, instructions to cause the processor subsystem to display the aggregate alertness score in a presentation.

Example 52 is at least one machine-readable medium including instructions that, when executed by processing circuitry, cause the processing circuitry to perform operations to implement of any of Examples 1-51.

Example 53 is an apparatus comprising means to implement of any of Examples 1-51.

Example 54 is a system to implement of any of Examples 1-51.

Example 55 is a method to implement of any of Examples 1-51.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 7 is an example user interface, according to an embodiment:

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

An operator is a human who operates equipment, machinery, vehicles, or other human-controllable devices. Examples of operators include, but are not limited to truck drivers, car drivers, crane operators, drone operators, forklift drivers, press machine operator, and the like. While operators may include people who work at desks, such as a telephone service or a computer technician, monitoring the fatigue of such operators may not be as critical as monitoring heavy machine operators. As such, although some example embodiments discussed herein refer to vehicle operators, and in particular to heavy equipment, such as mining vehicles, it is understood that the concepts and mechanisms may be applied to a wide variety of situations.

The systems and methods described herein monitor fatigue events. A fatigue event is an event where the operator exhibits fatigue, exhaustion, tiredness, distraction, or other aspects of non-alertness. Fatigue events may be defined by a system architect, system implementer, or other administrative user. Examples of fatigue events include, but are not limited to long eye blinks, extended staring (e.g., reduced eye motion activity), head nods, slouched posture, slower breathing rhythms, reduced heart rate, or the like. Additionally, fatigue events may be defined by contextual or environmental parameters, such as sudden or late braking, reduced steering wheel adjustments, inconsistent vehicle acceleration, or the like.

A centralized computer system collects information about fatigue events for a single operator or a group of operators (e.g., a work crew or enterprise-wide), and calculates an alertness score. The alertness score is based on an inverse logistic function (or S-shaped sigmoid function), such that having two or more fatigue events in a given timeframe (e.g., a work shift) result in a significantly lower alertness score than only have one fatigue event. An aggregate alertness score may be calculated over a time period of days or weeks to determine trends for a particular operator. Additionally, multiple operators may be combined to determine other statistical alertness calculations. A jobsite foreman or other monitoring agent may use the alertness calculations to determine who is posing a risk or derive other insights into operating conditions at a workplace, jobsite, or the like.

Figure 1:
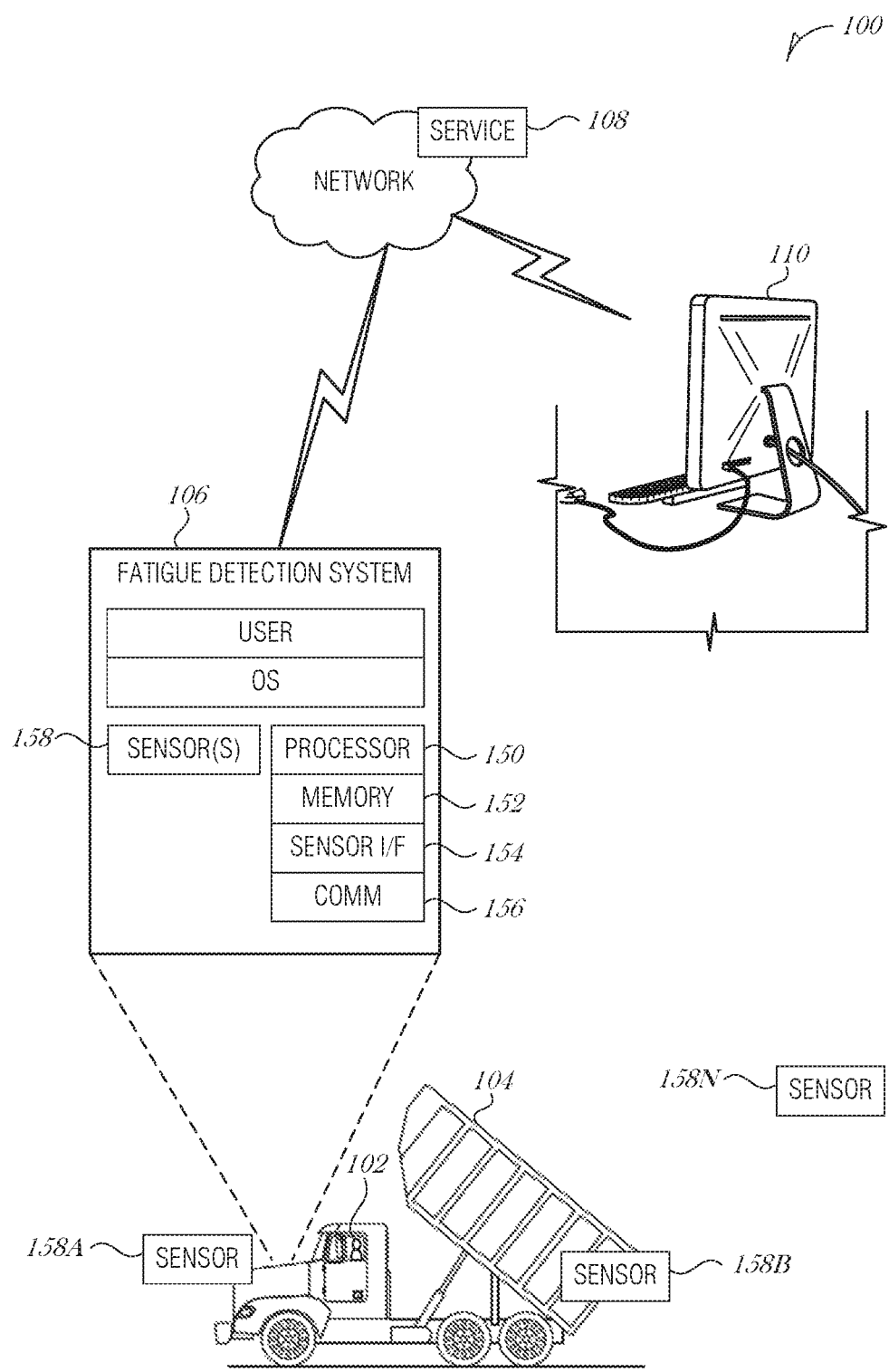
FIG. 1 is a block diagram illustrating an operating environment, according to an embodiment.

FIG. 1 is a block diagram illustrating an operating environment 100, according to an embodiment. A human operator 102 is operating a piece of equipment 104. The equipment 104 may be in the form of a truck, forklift, loader, digger, excavator, compactor, drills, harvester, shovel, dozer, pipelayer, on-highway trucks, passenger vehicle, or the like. Operating the equipment 104 may include various activities such as driving, loading, dumping, digging, boom operation, etc.

A fatigue detection system 106 is installed or placed in or around the equipment 104. The fatigue detection system 106 may include one or more components such as cameras, biometric or physiological sensors, environmental sensors, or the like. Cameras may be visible light cameras, infrared cameras, depth cameras, etc. Biometric or physiological sensors may be configured to sense biorhythms such as heart rate, breathing rhythm, skin temperature, etc. Environmental sensors may detect ambient temperature, time, location, etc. Additionally, the fatigue detection system 106 may interface with on-board systems in the equipment, such as by way of a CANBUS (Controller Area Network bus) or other interface. The CANBUS is a vehicle bus standard that is widely used to interface with sensors, instrumentation, engine control units, transmission, safety equipment, driver assistance system, and the like. The fatigue detection system 106 may track vehicle operational data via a CANBUS to determine how the operator 102 is using the equipment 104 and infer an alertness of the operator 102.

The fatigue detection system 106 includes a processor subsystem 150, memory 152, a sensor interface 154, a communication circuit 156, and associated circuitry. The processor subsystem 150 may include one or more processors with each processor including one more processing cores. Examples of a processor subsystem 150 include, but are not limited to an INTEL® Core™ processor, an INTEL® Celeron™ processor, an Advanced Micro Devices (AMD) Ryzen™ processor, an Advanced RISC Machines (ARM) processor, or the like. The processor subsystem 150 may include one or more specialized processors, such as a graphics processing unit (GPU), a digital signal processor (DSP), a field programmable gate array (FPGA), or a fixed function processor.

The memory 152 may include one or more semiconductor memory devices, such as random access modules (RAM), dynamic RAM, electrically programmable read-only memory (EPROM), electrically erasable programmable read-only memory (EEPROM), SRAM, or flash memory devices. The memory 152 may be configured to store instructions to be executed by the processor subsystem 150. The memory 152 may include removable storage, such as a micro Secure Digital (microSD) card. The memory 152 may be hardware encrypted to ensure security.

The sensor interface 154 includes circuitry to communicate with one or more sensors 158A-N installed in or around the equipment 104. Sensors 158A-N may include various devices, such as cameras, infrared cameras, motion detectors, pressure detectors, temperature sensors, global navigation satellite system (GNSS) devices to detect geolocation, clocks, and the like. Sensors 158A-N may be incorporated into the same housing as other components of the fatigue detection system 106. Alternatively, one or more sensors 158A-N may be external to the fatigue detection system 106 (e.g., mounted to the equipment 106 or positioned to observe the area where the equipment 106 is being operated) and communicatively coupled to the fatigue detection system 106. Sensors 158A-N may be coupled using a wired or wireless communication mechanism, such as Ethernet, Wi-Fi, Bluetooth, or the like.

Some or all of data obtained or collected from the sensors 158A-N may be stored in the memory 152. Sensor data is used to determine whether a fatigue event has occurred. Fatigue events are classified, such as with a machine learning model. Fatigue events may be determined using factors include long eye blinks, head nods, slumped posture, lowered heart rate, slower reaction rates, or combinations of such factors. Determination of fatigue events may be performed at the sensor 158A-N (e.g., a camera equipped with a local image classifier to determine a fatigue event), at the fatigue detection system 106 (e.g., with the processor subsystem 150 executing a classifier), or remotely, for example at a cloud service 108 operating in a network-accessible location.

The processor subsystem 150 may act on the data stored in the memory 152 using various functions, processes, and other mechanisms described herein. Alternatively, or in combination with local data processing, external or offsite data processing may be used. Data may be transmitted to a remote location using the communication circuit 156. For instance, the cloud service 108 may be provided to perform data analysis or classification and determine whether a fatigue event has occurred.

Fatigue events are logged with various metadata, such as an operator identification, an equipment identifier, a location, a date and time of the event, a type of fatigue event, a severity of the fatigue event, or the like. The logging may be stored locally, for example in memory 152, and uploaded when communication links are available. For instance, trucks that operate in deep mines may not have cellular connectivity. In such a situation, data about fatigue events, fatigue event logs, sensor information, or other data may be cached locally at the equipment 104 until connectivity is restored (e.g., when the truck returns to the surface).

The fatigue detection system 106 may conduct data analytics on the fatigue events. Alternatively, the cloud service 108 may perform data analytics on the fatigue events. The data analytics may include operations such as data aggregation, normalization, statistical data mining, reporting, or the like.

An alertness score is calculated using the fatigue events. The alertness score is calculated using a non-linear function. The non-linear function may be a sigmoid function, a logistic function, a polynomial function, an asymptotic function, or other non-linear function. The alertness score represents how alert the operator 102 is over a period of time. The alertness score may be measured over an operator's shift (e.g., 8 hours), a 24-hour period, a week, or other interval.

A client system 110 may access the cloud service 108 and obtain reports, execute real-time reports, review alertness scores of one or more operators over one or more periods, issue notices or alerts to the operators, control equipment 106 remotely, or the like. The client system 110 may be used by a shift supervisor, administrative user, or other person overseeing operations. Multiple client systems 110 may be used to access data from the cloud service 108 so that people from multiple departments within an organization may review alertness scores and trends, for example. The client system 110 may be of any type of compute platform including, but not limited to a desktop, laptop, cellular phone, tablet, or wearable device.

Figure 2:
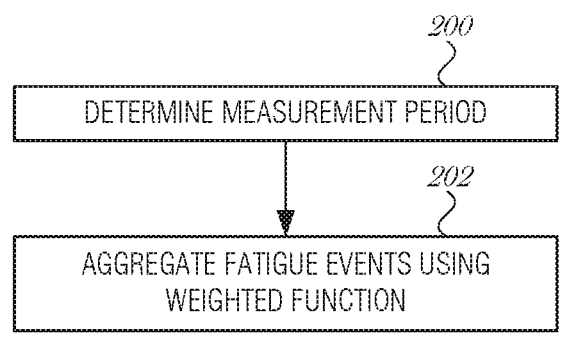
FIG. 2 is a flowchart illustrating a method to calculate an alertness score, according to an embodiment.

FIG. 2 is a flowchart illustrating a method to calculate an alertness score, according to an embodiment. A measurement period is determined (operation 200). The measurement period is the period during which an operator 102 is monitored. The measurement period may be a discrete amount of time, such as eight hours, or a labeled amount of time, such as a shift, where a length of the shift may be variable for each employee.

The fatigue detection system 106 is used to identify fatigue events that occur during the measurement period. The fatigue events are logged and recorded so that a number of fatigue events, n, for each measurement period is available. At operation 202, the number of fatigue events over multiple measurement periods are aggregated in a weighted function:

$$\text{Alertness Score} = \frac{n_0 w_0 + n_1 w_1 + n_2 w_2 + n_3 w_3 + n_{3+} w_{3+}}{w_0(n_0 + n_1 + n_2 + n_3 + n_{3+})} \times 100 \quad \text{Eq. 1}$$

where $n_0$ represents the number of measurement periods where the operator experienced zero fatigue events, $n_1$ is the number of measurement periods where the operator experienced one fatigue event, $n_2$ is the number of measurement periods where the operator experienced two fatigue events, $n_3$ is the number of measurement periods where the operator experienced three fatigue events, and $n_{3+}$ is the number of measurement periods where the operator experienced more than three fatigue events.

Weights $w_0$, $w_0$, $w_1$, $w_2$, $w_3$, and $w_{3+}$ are calculated using a non-linear function. In an embodiment, the weights are calculated using an inverse sigmoid function. It is understood that more or fewer weights may be used depending on the design of the system.

Equipment operators 102 have a certain number of verified fatigue events per period. Verified fatigue events are not equal and should be weighted depending on whether they are the first, second, or third or later event. The weighting is not linear since having zero or even one fatigue event is qualitatively distinct from having two or three per shift. In an embodiment, the weights are calculated using the inverse sigmoid function:

$$w_x = \frac{a}{1 + b^{-(ex-d)}}$$

where a is the scale of the weight, b is the rate of the gradient change, d is used to express the maximum number of acceptable fatigue events (e.g., controlling the tail of the graph), x is the number of fatigue events, and e is the constant value of 2. Example values are a=100, b=0.15, and d=3 so that the scale is from 0 to 100 and the maximum number of acceptable fatigue events in a shift is three. It is understood that other values may be used, or that other functions may be used, to express the policies of an organization with respect to how many fatigue events are acceptable in a time period, how second or third events should be penalized with respect to the first event, and other considerations.

Using the example values from above where a=100, b=0.15, d=3, and e=2, Eq. 2 produces the following weights $w_x$ for each fatigue event x.

TABLE 1

| x | $w_x$ |
|---|---|
| 0 | 100 |
| 1 | 87 |
| 2 | 13 |
| 3 | 0 |

Figure 3:
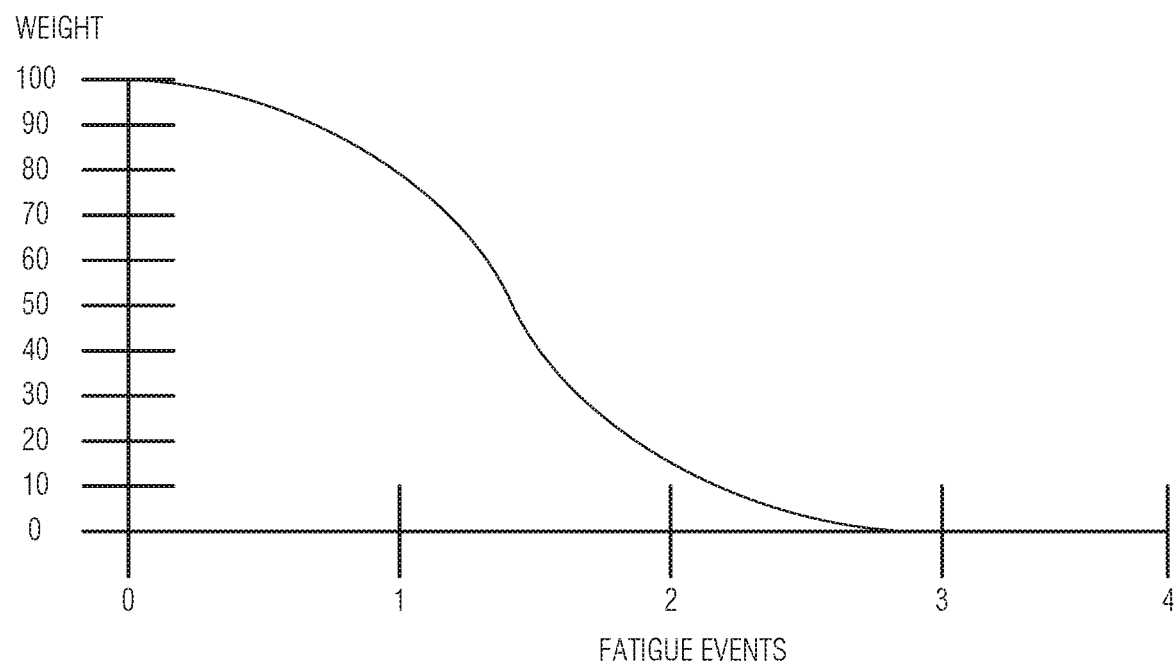
FIG. 3 is an example graph of a sigmoid function, according to an embodiment.

Using the values in Table 1, it can be observed that an operator that has two fatigue events in a given period (e.g., shift) will be assigned an alertness score of 13 for that period, which is significantly lower than another operator who only had one fatigue event in a shift. An example graph of the sigmoid function Eq. 2, is illustrated in FIG. 3.

Figure 4:
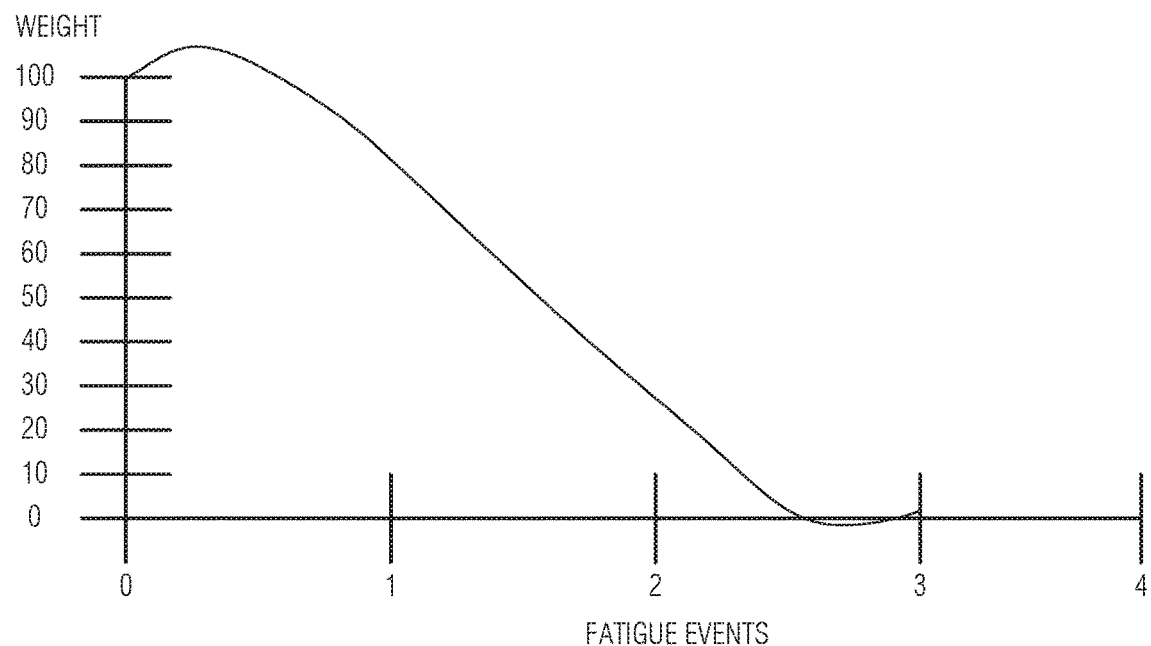
FIG. 4 is an example graph of a polynomial function, according to an embodiment.

A polynomial function is illustrated in FIG. 4, which may provide similar alertness scores and may be used as an alternative function based on the desired output. The polynomial function used in FIG. 4 is $15x^3-68.778x^2+38x+100$. With this polynomial equation, the following weights $w_x$ for each fatigue event x are calculated.

TABLE 2

| x | $w_x$ |
|---|---|
| 0 | 100 |
| 1 | 84 |
| 2 | 21 |
| 3 | 0 |

Using Eq. 1, scores are normalized to avoid biases over shift schedules or days worked. It is important to eliminate bias from scheduling differences. Any number of works days may be aggregated using Eq. 1 so that weekly, monthly, yearly, or other intervals may be analyzed by a shift manager or other administrative user. A moving average may be used to analyze the last twenty-one days, or any moving window of days, shifts, or other periods.

For example, the fatigue events may be aggregated over time using Eq. 1, as described above. So, if an operator had a whole work week of days with two fatigue events each day, then the weighted and normalized score is still 13 (e.g., $\{(n_2*w_2)/[w_0*(n_2)]\}*100=\{(5*13)/[100*(5)]\}*100=13$). As another example, if the operator had two days with no fatigue events, one day with one fatigue event, and two days with two fatigue events, the weighted and normalized score would be:

$$\text{Alertness Score} = \frac{\{(2*100)+(1*87)+(2*13)\}}{100*(2+1+2)} *100 = 62.6$$

In addition, individual weighted scores can then be averaged across a crew to create a crew alertness score, averaged across operators in a shift to create a shift alertness score, or averaged across a site a create a site alertness score. Also, weighted scores can be compared between day and night shifts or other variables. Other aggregations, averages or statistical analyses may be performed to provide insight to a manager, executive, or administrative user. Aggregations may include multiple operating sites, multiple business units, multiple work crews, or other data slices.

Other key performance indicators may be calculated from the individual weighted scores, such as to identify those people who are below a threshold and may be considered unsafe or in need of help; calculating a fatigue score for the week or day across a crew or job site; correlating fatigue scores or fatigue events with equipment losses, health insurance claims, or other expenses; or identifying inefficient equipment usage, for example by analyzing and correlating fatigue events with telematics from vehicles.

Figure 5:
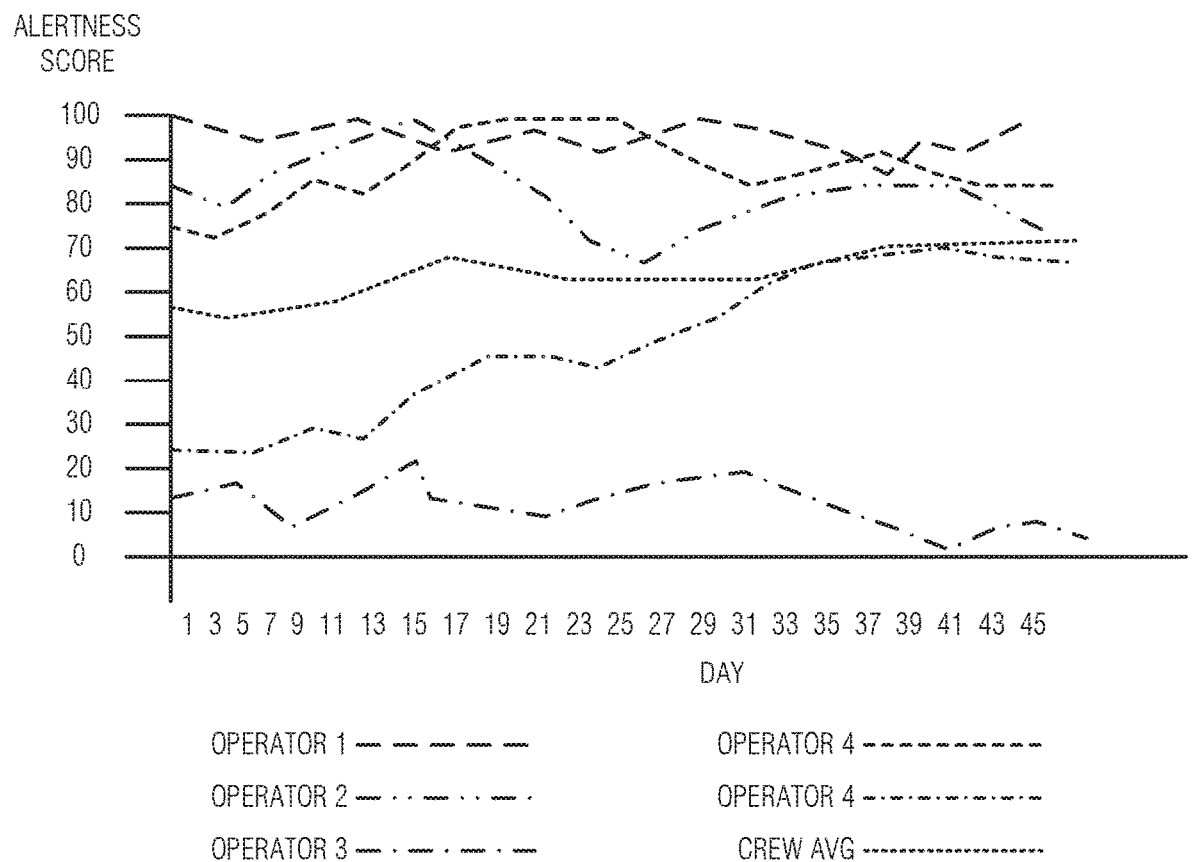
FIG. 5 is a graph illustrating alertness trends over a period of time, according to an embodiment.

FIG. 5 is a graph 500 illustrating alertness trends over a period of time, according to an embodiment. The graph 50X) includes the days on the x-axis and the alertness score for several operators and an average of the operators on the y-axis. In particular, the graph 500 includes a measurement of 'Operator 1' 502A, 'Operator 2' 502B, 'Operator 3' 502C, 'Operator 4' 502D, and 'Operator 5' 502E. The graph 500 also includes a Crew Average alertness score 504.

Based on the fatigue events of a single time period (e.g., a single shift), an aggregate of time periods (e.g., multiple days or multiple shifts), or across several people, a variety of remedial actions may be initiated. For instance, on the occurrence of the first fatigue event, an operator may be notified that the event was observed and logged. The notification may be a visual, audible, tactile, or other mode or combination of modes. The notification may include an electronic message to the operator (e.g., a text message or email message to a corporate messaging server), to the operator's manager or supervisor, to third-party regulators or agencies (e.g., to a governmental safety agency or the corporate insurance company), or the like.

Another remedial action may include partial or complete disabling of the equipment that the operator is controlling. For instance, on a first fatigue event, the equipment may be partially disabled so that the there is less chance of disaster if the operator experiences a second fatigue event. Examples include, but are not limited to, reduced maximum driving speed, reduced vehicle acceleration, or the like. On a second fatigue event, depending on the maximum allowable fatigue events, the equipment may be further disabled or may be completely disabled. The amount, type, severity, timing, or other aspects of equipment disabling may be controlled by policies enacted by the corporation or by administrative users.

The equipment may be a vehicle and the remedial action may be initiated by way of an advanced driver assistance system (ADAS) or an autonomous vehicle control system. In other machinery, interfaces to a control system, power system, steering system, or the like, may be used to reduce or disable functionality after a threshold number of fatigue events has been detected.

Figure 6:
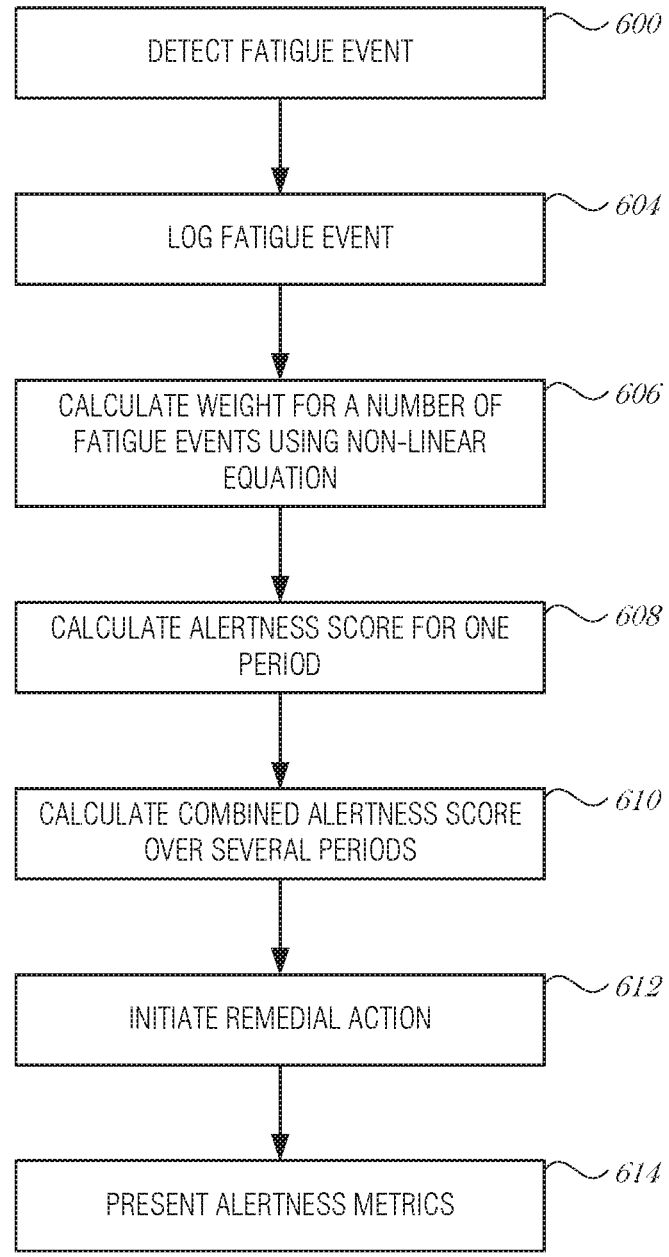
FIG. 6 is a block diagram illustrating data and control flow, according to an embodiment.

FIG. 6 is a block diagram illustrating data and control flow, according to an embodiment. At 600, a fatigue event is detected. The fatigue event may be detected using various mechanisms including, but not limited to image analysis, biometric detection, posture detection, vehicle telematics, external factors, etc.

At 602, the fatigue event is logged in a data store. A number of fatigue events for a given time period is determined (operation 604). At 606, a weight for the number of fatigue events is calculated using a non-linear equation that takes into consideration a number of fatigue events during a period of time. Using a non-linear equation provides the advantage, as discussed above, where an operator who experiences no fatigue events or a single fatigue event is not penalized as much as an operator who experiences more events in a period.

At 608, an alertness score is calculated using the number of fatigue events during the period of time, and the weight of the number of fatigue events during the period of time. The period of time may be a work shift, for instance.

At 610, optionally, a combined alertness score is calculated over several time periods. For instance, the combined alertness score may represent an aggregate alertness score over a week's worth of work shifts. The combined alert score may be normalized over several time period's worth of data.

At 612, a remedial action is initiated based on the alertness score or the combined alertness score. The remedial action may include alerting the operator, modifying the operation of equipment being used by the operator, alerting a supervisor, or the like.

Figure 7:
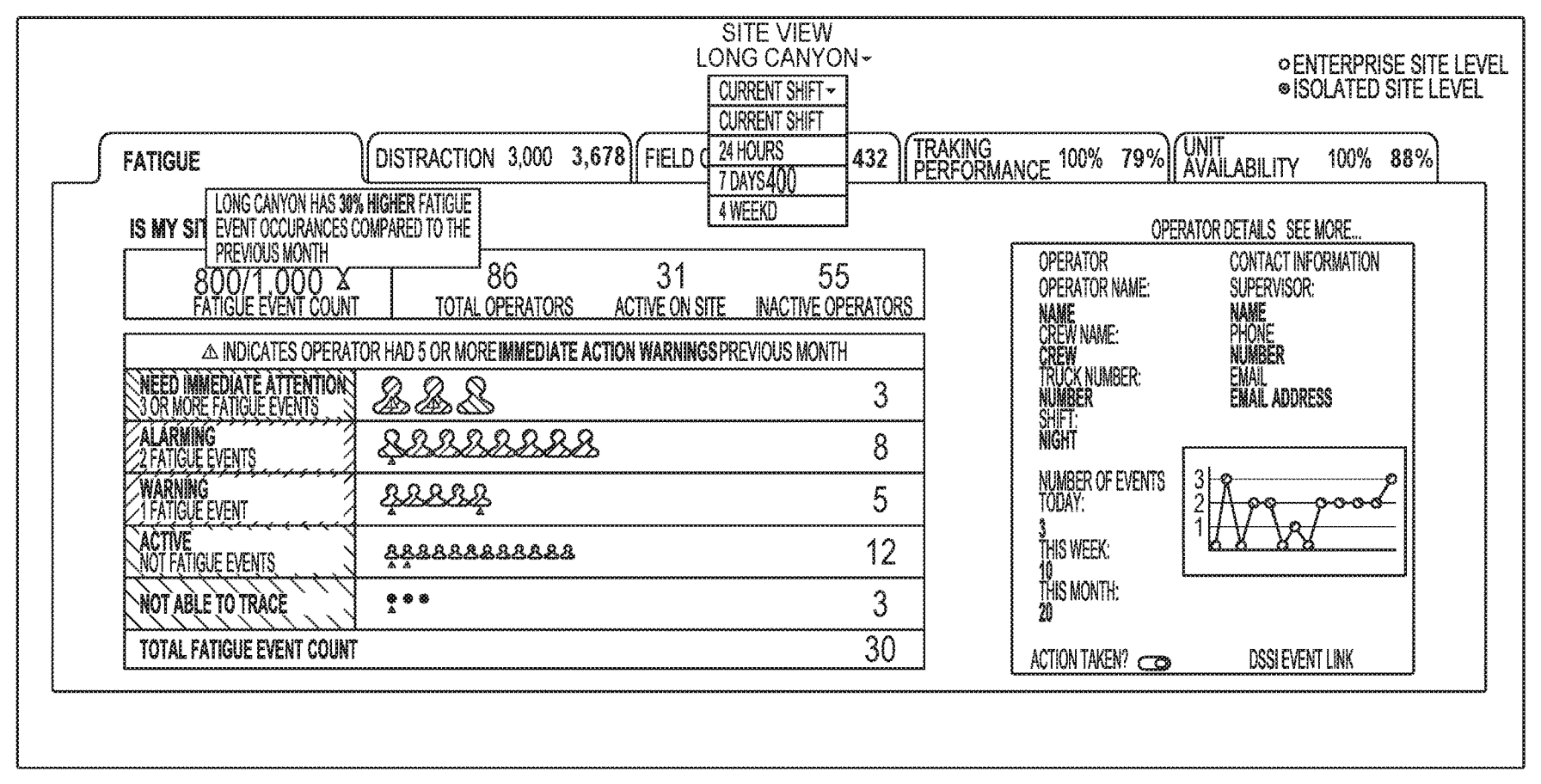
Figure 8:
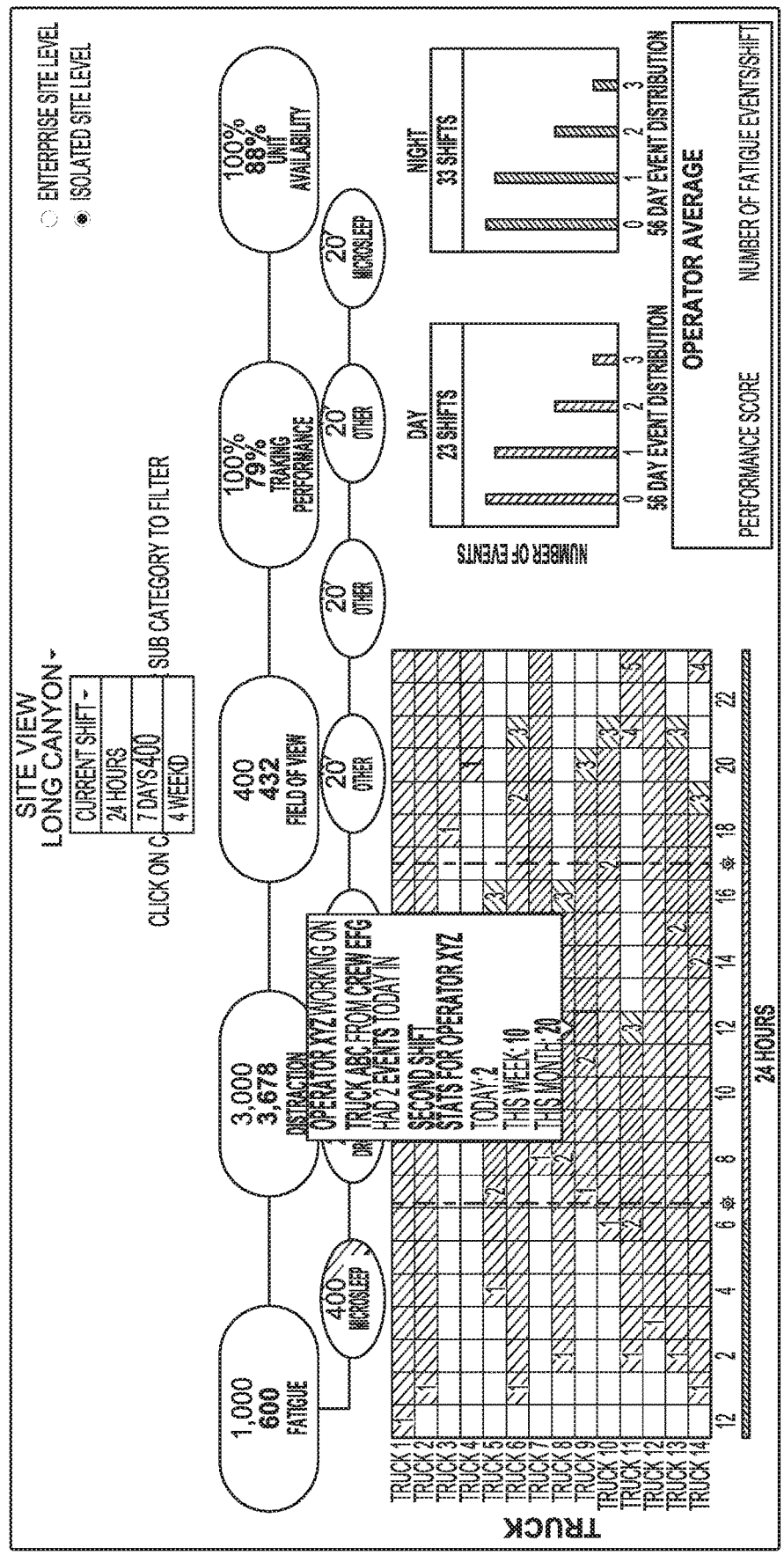
FIG. 8 is an example user interface, according to an embodiment.

At 614, alertness metrics are displayed in a user interface. The user interface may be configurable to display different data views of the alertness scores of one or more operators at one or more job sites, for example. FIGS. 7-8 are example user interfaces, according to embodiments. FIG. 7 illustrates a dashboard view with operators at a particular work site. The operators who have fatigue events are listed in descending order. Clicking or activating an icon representing an operator brings up a sub-presentation with specifics about the operator. FIG. 8 illustrates another dashboard view of historical fatigue events. The size of the historical period to display is controlled using a drop-down menu control. In the example illustrated, data for each particular piece of equipment is presented over a 24-hour period. Additional aggregate information about day and night shifts is displayed. The user may display enterprise-wide data and statistics or choose one or more sites to view. A supervisor may view the user interface to determine which operator are at risk, how a crew or group of operators are performing, execute reports for additional data analysis, or the like.

In an example, fatigue events are tagged with the time that they occur. For a particular operator who experiences multiple fatigue events, the average time between fatigue events may be used to provide further insight into the severity of fatigue or likelihood of future events. For instance, if an operator had a fatigue event at 9:00 AM, another at 12:00

PM, and then another at 3:00 PM, the average time between then is three hours. A different user who experienced fatigue events at 11:00 AM, 11:30 AM, and 12:00) PM, has an average time of 30 minutes. This is a meaningful metric that may provide insight to identify a person who is more at risk.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hard-wired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 9:
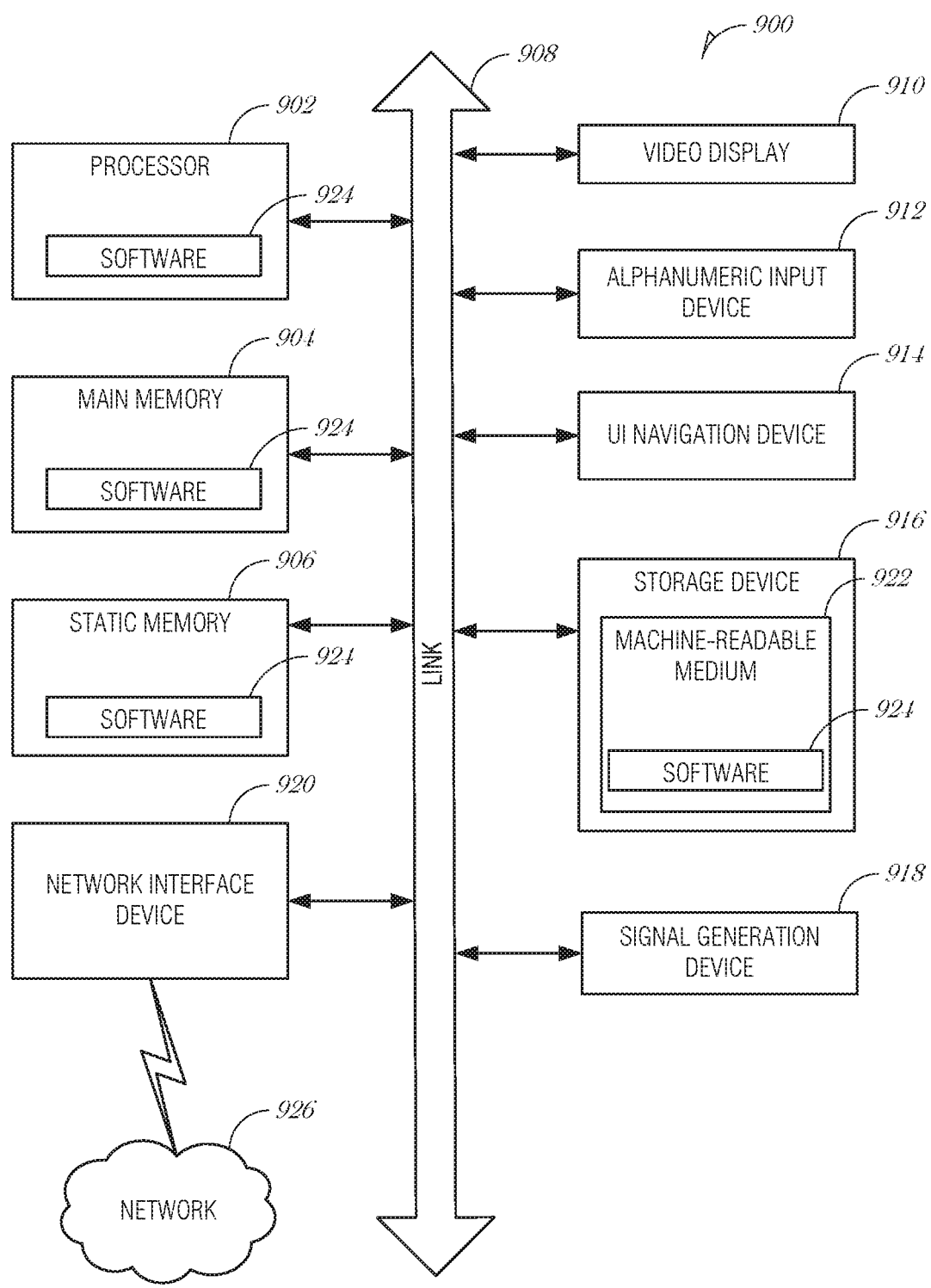
FIG. 9 is a block diagram illustrating an example processing system upon which any one or more of the techniques (e.g., operations, processes, methods, and methodologies) discussed herein may be performed.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 9 is a block diagram illustrating a machine in the example form of a computer system 900, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an infotainment system, a driver's assistance system, a safety system, an engine control system, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, gyrometer, magnetometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

INDUSTRIAL APPLICABILITY

Alertness monitoring is crucial in many operating environments, especially those where heavy machinery, vehicles, or dangerous equipment is in use. The present document discusses alertness monitoring, instead of fatigue monitoring, to provide a positive connotation of measuring how alert a person is, rather than how fatigued they are. Supervisors, crew, and other people are able to review visual representations of alertness to recognize operators needing help and to compare operators over different time periods. The alertness score may be used for analytics with other data such as productivity data, safety data, or equipment telematics data. Additionally, the alertness score may be used to initiate remedial responses to ensure the safety of the operator and of others. The remedial responses may also avoid or reduce damage to equipment, which will reduce downtime, lost profits, or scheduling conflicts.

This disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A system for monitoring alertness, the system comprising:
   a processor subsystem; and
   a memory comprising instructions, which when executed by the processor subsystem, cause the processor subsystem to:
      determine a number of fatigue events of that an operator experienced while operating equipment over a time period;
      determine a weighted alertness score based on the number of fatigue events, the weighted alertness score determined using a non-linear function, wherein the non-linear function is an inverse sigmoid function; and
      initiate a remedial response based on the weighted alertness score.

2. The system of claim 1, wherein the time period is a work shift.

3. The system of claim 1, wherein the non-linear function is a polynomial function.

4. The system of claim 1, wherein to initiate the remedial response, the processor subsystem is to interface with an advanced driver assistance system.

5. The system of claim 1, wherein to initiate the remedial response, the processor subsystem is to interface with an autonomous vehicle control system.

6. The system of claim 1, wherein the remedial response comprises reducing a functionality of the equipment.

7. The system of claim 1, wherein the remedial response comprises disabling a functionality of the equipment.

8. The system of claim 1, wherein the remedial response comprises generating an alert notification.

9. The system of claim 8, wherein the alert notification is presented to the operator.

10. The system of claim 8, wherein the alert notification is presented to a supervisor of the operator.

11. The system of claim 8, wherein the alert notification comprises one of: an audible alert, a visual alert, or a haptic alert.

12. The system of claim 1, comprising instructions to cause the processor subsystem to:
    display the weighted alertness score in a presentation.

13. The system of claim 1, further comprising instructions to cause the processor subsystem to:
    aggregate weighted alertness scores of several time periods to calculate an aggregate alertness score.

14. The system of claim 13, further comprising instructions to cause the processor subsystem to:

average aggregate alertness scores of a plurality of operators over the several time periods.

15. The system of claim 14, wherein the plurality of operators comprise a work crew.

16. The system of claim 13, further comprising instructions to cause the processor subsystem to:
display the aggregate alertness score in a presentation.

17. A method of monitoring alertness, the method comprising:
determining, at a processor-based system for monitoring alertness, a number of fatigue events of that an operator experienced while operating equipment over a time period;
determining, at the processor-based system for monitoring alertness, a weighted alertness score based on the number of fatigue events, the weighted alertness score determined using a non-linear function, wherein the non-linear function is an inverse sigmoid function; and
initiating, by the processor-based system for monitoring alertness, a remedial response based on the weighted alertness score.

18. The method of claim 17, comprising displaying the weighted alertness score in a presentation.

19. A system for monitoring alertness, the system comprising:
a processor subsystem; and
a memory comprising instructions, which when executed by the processor subsystem, cause the processor subsystem to:
determine a number of fatigue events of that an operator experienced while operating equipment over a time period;
determine a weighted alertness score based on the number of fatigue events, the weighted alertness score determined using a non-linear function;
initiate a remedial response based on the weighted alertness score;
aggregate weighted alertness scores of several time periods to calculate an aggregate alertness score; and
average aggregate alertness scores of a plurality of operators over the several time periods.

20. The system of claim 19, wherein the plurality of operators comprise a work crew.

21. The system of claim 19, further comprising instructions to cause the processor subsystem to:
display the aggregate alertness score in a presentation.

* * * * *